United States Patent Office 2,939,803
Patented June 7, 1960

2,939,803

METHOD OF IMPREGNATING A POROUS MATERIAL

Gordon N. Steele, El Segundo, Calif., assignor, by mesne assignments, to the United States of America as represented by the United States Atomic Energy Commission No Drawing. Filed Jan. 6, 1956, Ser. No. 557,636

6 Claims. (Cl. 117—47)

This invention relates to porous impregnation with a solid substance and particularly to a method of obtaining substantially uniform impregnation of the interconnected pores of a porous material with a preselected solid substance.

This application is a continuation-in-part of the patent application entitled "Impregnated Article and Process," Serial No. 220,335, filed April 10, 1951, now abandoned, by Gordon N. Steele.

It is frequently desirable, particularly in the nuclear field and in the gaseous phase catalytic field, to produce a substantially uniform distribution of one solid substance in the interconnected pores of a second substance. Thus, in the nuclear reactor field, certain reactors are of the solid core, graphite moderated, homogeneous type. These reactors utilize a substantially uniform distribution of the nuclear fuel, usually the isotope of uranium having an atomic weight of 235 (U–235), in the interconnected pores of a block of graphite, which serves as the moderator. The process of this invention accomplishes this distribution with a degree of uniformity which was unattainable by methods known in the past.

In the catalytic field, it is frequently desirable to facilitate reactions between elements or compounds in the gaseous phase. Since the catalysts are seldom in the gaseous state, they should preferably be suitably supported in the gaseous mixture by a porous carrier which may be composed of a carbonaceous, pumice, or asbestos material. A uniform distribution of the catalyst through the pores of the carrier is desirable to provide maximum possible surface contact between the catalyst particles and the gaseous mixture.

In the past, impregnation of a porous material has been achieved by dissolving the impregnant in a solvent, saturating the porous material with the resultant solution, and then removing the solvent by evaporation. The difficulty with this process is that, as the solvent is removed by evaporation, a greater concentration of impregnant is obtained near the surface of the porous material, since evaporation proceeds longer and at a faster rate near the surface of the porous material than in the interior thereof.

It is therefore an object of this invention to provide a method of impregnating a porous material with an impregnant uniformly throughout the interconnected pores of the porous material.

It is another object of this invention to provide an impregnation method which permits a fast rate of solvent evaporation.

It is a further object of this invention to provide an improved method of uniformly impregnating a block of porous graphite with U–235.

It is another object of this invention to provide a method of impregnating graphite with a U–235 containing compound comprising saturating the interconnected pores of graphite with a solution containing a U–235 compound in predetermined concentration; diffusing a gaseous precipitating agent into the saturated pores of the graphite to form thereby a precipitate containing the U–235 and evaporating the remaining solution from the pores of the graphite.

It is yet another object of this invention to provide a method of constructing a fuel element for a nuclear research reactor having a homogeneous, graphite moderated core of preselected design comprising saturating the interconnected pores of a graphite block of said core with a solution containing a soluble precipitant of a U–235 containing compound, the concentration of U–235 in said solution being the desired concentration of U–235 in the interconnected pores of said graphite fuel block; diffusing a gaseous precipitant of said soluble precipitant into the saturated pores of said graphite fuel block; and evaporating the remaining solution from the pores of said graphite fuel block.

Other objects of this invention will become apparent from the following description and examples of invention.

In accordance with this invention it has been found that if a soluble salt having a cation in common with impregnant material is dissolved in a suitable solvent, and if the porous material to be impregnated is saturated with the resultant solution, a substantially uniform distribution of the soluble salt within the voids of the porous material can be achieved. By porous material is meant any material having interconnected pores or interstices, such as wood, graphite, ceramics, plastic, glass, rock wood, pumice, asbestos, or wood fiber. However, before the solvent is evaporated in accordance with this invention, the soluble salt is reacted in situ with a gas which is diffusible in the solution, and with which the soluble salt reacts to form an insoluble precipitate, or with the reaction product of a gas and the solution to form the insoluble precipitate. The gas or reaction product of the gas and the solution must be characterized by containing the anion of the impregnant desired. The remaining fluid reaction products may then be removed by evaporation without destroying the uniformity of distribution of the impregnant within the pores of the porous material.

The following examples illustrate the invention more particularly.

EXAMPLE 1

*Impregnation of porous graphite with an oxide of uranium*

In this embodiment of the invention, it is desired to construct a fuel element for a solid core, graphite moderated homogeneous nuclear research reactor. The core of such homogeneous graphite nuclear research reactor is preferably composed of a plurality of individual fuel blocks in which uranium is homogeneously dispersed in a graphite moderator. This uranium is preferably highly enriched in U–235 (that is, a high percentage of the uranium atoms are the fissionable nuclide of the uranium element having a mass number of 235). These U–235 atoms are the solid impregnate which is to be uniformly distributed throughout the interconnected pores of the graphite fuel blocks by the process contemplated by this invention. In addition to the uniform distribution of the U–235 impregnate in the pores, an accurate control over the concentration of the impregnate in the block is desired. Thus the impregnation process deposits uniformly in the pores of the graphite block a predetermined mass of the impregnate U–235 per unit volume of graphite. As an example, a typical graphite moderated research reactor has approximately 800 liters of graphite in the core to serve as the moderator for a mass of U–235 of approximately 3.5 kilograms. It is to be noted that the exact figures for particular reactors and for particular fuel elements within a reactor vary since they are dependent on the particular reactor design used. In this assumed example, a U–235 impregnate concentration of approximately 4.5 milligrams/cc. of graphite is desired in the fuel blocks. Successful U–235 impregnation has been accomplished with final U–235 concentration of from 1 to 5 milligrams/cc. of graphite.

The size and shape of the fuel blocks may be varied. As an example, a particular block may have physical dimension of 4.18 inches on the side, 21 inches long, and a 1.25 inches in diameter coaxial hole extending the entire length. A typical research reactor would have 140 of these fuel blocks in its core. In operation, the coaxial hole is used to convey a coolant fluid to thereby continuously cool the fuel blocks.

Initially, blocks of pure porous graphite are constructed with the size and shape of the desired fuel blocks. Then, the effected porosity of each graphite block is found. This effective porosity is defined as the percentage ratio of the total volume of interconnected pores to the total volume of the graphite blocks. Crystalline graphite, i.e., graphite without any pores, has a density of 2.25 gm./cc. Commercially available graphite has a bulk density which is dependent on the process used in its manufacture. A typical commercial grade graphite has a bulk density of 1.7 gm./cc. The theoretical porosity of this commercial grade graphite calculated on the basis of zero porosity for crystalline graphite is therefore .55/2.25×100, or 24.4 percent. However, not all of the pores in the graphite block are interconnected. Thus, approximately 20 percent by volume of the pores are closed off and thus inaccessible to the impregnating solution. This means that the effective porosity of a typical graphite block is 24.4×.8, or approximately 19.5 percent.

The effective porosity of the graphite block can be determined experimentally. The graphite block may first be placed in a sealed container and then the container and the pores of the graphite evacuated to a high vacuum. A liquid of known density and having a viscosity substantially equivalent to the impregnating solution, to be described later, is then added to the sealed container completely covering the graphite block. The high vacuum is maintained in the sealed chamber. At this point only a small amount of the fluid enters the interconnected pores of the graphite block. The saturation of the pores with the fluid is accomplished by slowly raising the pressure in the sealed chamber to atmospheric, thereby forcing the fluid into the pores. The temperature of the fluid is measured and the block is withdrawn from the chamber, drained and quickly weighed. The total volume of the interconnected pores is found by dividing the increase in weight of the block by the density of the fluid at the measured temperature. The effective porosity of the block is found by dividing the total volume of the interconnected pores by the total volume of the block. The fluid in the pores of the graphite block is then removed by drying the block to a constant weight before beginning the following impregnation step:

The impregnation fluid is now mixed. The concentration of the impregnate in the fluid needed to obtain the desired concentration of impregnate in the porous body is calculated from the effected porosity previously obtained. From the above example, assume a desired impregnate density of 4.5 milligrams of U–235 per cubic centimeter of graphite and an effective porosity of 19.5 percent, a uniform mixture containing 4.5/.195 or 23.1 milligrams of U–235 per cubic centimeter of mixture fluid is prepared.

The preferred impregnation fluid is composed of a water solution of uranyl nitrate, $UO_2(NO_3)_2$. The method of obtaining the desired concentration of U–235 in this solution is well-known to those skilled in the art and need not be further described here. The pores of the graphite are then filled with this solution (U–235 concentration, 23.1 milligrams/cc.) of uranyl nitrate, preferably by the method previously described with respect to filling the pores with the porosity measuring fluid. The sealed chamber in which the saturated block of graphite is placed is then pressurized with air at 95 p.s.i. for 24 hours at 119° C. After the interconnected pores in the graphite block are completely filled with aqueous uranyl nitrate, the blocks containing the uranyl nitrate are removed from the sealed chamber, drained and quickly placed in a second chamber which is filled with ammonia gas at 120 p.s.i. for 24 hours. The ammonia gas dissolves and diffuses into the water solvent forming ammonium hydroxide according to the reaction $NH_3+H_2O \rightarrow NH_4OH$. The ammonium hydroxide then reacts with the uranyl nitrate in situ to form an insoluble compound containing the uranium and a soluble salt of nitrate according to the reaction:

$$6NH_4OH+2UO_2(NO_3)_2 \rightarrow (NH_4)_2U_2O_7 +4NH_4NO_3+3H_2O$$

The water and ammonium nitrate are removed by placing the block in a dessicator over anhydrous $CaSO_4$ for four days, dried further in a furnace by heating to 150° C. for 8 hours under helium pressure of 100 p.s.i., and fired in a helium atmosphere by heating gradually to 800° C. over a 4 hour period. Because the uranium containing compound is insoluble in water and in the other products of the reaction, its distribution within the interconnected pores of the graphite is left unchanged while the water and ammonium nitrate travel to the surface where they are eliminated as gases. After the water and ammonium nitrate have been removed, the firing of the graphite block yields a new and more stable oxide of uranium according to the reaction $$3(NH_4)_2U_2O_7 \rightarrow 6NH_3+3H_2O+O_2+2U_3O_8$$

This oxide of uranium remains in the pores with a substantially uniform distribution and with a concentration of 4.5 milligrams of U–235/cc. of graphite. The fuel block is then ready to be inserted in the core of an operable nuclear research reactor.

There are numerous other water-soluble inorganic, uranium-containing salts which can be used in place of the uranyl nitrate of this example and which react with dissolved ammonia or other gaseous precipitating agents, such as hydrogen sulfide, $H_2S$, to form a uranium-containing precipitate. Thus, uranyl sulphate ($UO_2SO_4$), uranyl chloride ($UO_2Cl_2$), and uranium tetrachloride ($UCl_4$) can be dissolved in water in preselected concentrations, the pores of the graphite block filled with this aqueous solution, and the uranium precipitated in situ by using ammonia or hydrogen sulfide diffused into the solution in the pores.

EXAMPLE 2

*Impregnation of a porous matrix with barium carbonate*

The specimen to be impregnated is saturated with barium chloride in the manner indicated in Example 1, the barium chloride being in an aqueous solution. Carbon dioxide is then introduced with the specimen into a closed chamber and carbon dioxide diffuses in the water, forming carbonic acid, which in turn reacts with the barium chloride to form insoluble barium carbonate and hydrochloric acid according to the formulas given below:

$$CO_2+H_2O \rightarrow H_2CO_3$$
$$H_2CO_3+BaCl_2 \rightarrow BaCO_3+2HCl$$

The hydrochloric acid may then be removed by evaporation, leaving the barium carbonate uniformly distributed throughout the porous matrix.

EXAMPLE 3

*Impregnation of a porous material with lead sulphate*

An aqueous solution of lead nitrate is introduced into the pores of any porous material. Sulphur trioxide gas is diffused into the water, forming sulphuric acid which in turn reacts with the lead nitrate to form insoluble lead sulphate and nitric acid in accordance with the following formulas:

$$SO_3+H_2O \rightarrow H_2SO_4$$
$$H_2SO_4+Pb(NO_3)_2 \rightarrow PbSO_4+2HNO_3$$

The nitric acid may then be evaporated by heat.

EXAMPLE 4

*Impregnation of a porous material with cadmium sulphide*

An aqueous solution of cadmium nitrate is introduced into the pores of the porous material and hydrogen sulphide gas which dissolves in water without reaction precipitates cadmium sulphide and leaves nitric acid as the other reaction product in accordance with the formula:

$$Cd(NO_3)_2 + H_2S \rightarrow CdS + 2HNO_3$$

The nitric acid may be readily removed by evaporation.

EXAMPLE 5

*Impregnation of a porous matrix with silver chloride*

An aqueous solution of silver nitrate is introduced into the pores of the material, after which gaseous hydrogen chloride is diffused into the water, dissolving without reaction. Silver chloride is then precipitated and nitric acid is given out as a gaseous product when the specimen is heated. The reaction occurs in accordance with the following formula:

$$HCl + AgNO_3 \rightarrow AgCl + HNO_3$$

EXAMPLE 6

*Impregnation of a porous matrix with samarium fluoride*

Samarium chloride dissolved in water is used as the impregnant and gaseous hydrogen fluoride as the precipitant to obtain, in a manner similar to the previous examples, samarium fluoride and hydrochloric acid in accordance with the formula:

$$3HF + SmCl_3 \rightarrow SmF_3 + 3HCl$$

Again, hydrochloric acid may be removed by evaporation.

EXAMPLE 7

*Impregnation of a porous matrix with sodium chloride*

The sodium chloride is precipitated from a solution of sodium ethylate in ethyl alcohol by reaction with hydrogen chloride gas according to the following reaction:

$$C_2H_5ONa + HCl \rightarrow C_2H_5OH + NaCl$$

The alcohol is then removed from the pores by evaporation.

EXAMPLE 8

*Impregnation of a porous matrix with ferric sulphide*

Iron sulphide is precipitated within the pores of the matrix by treating an ethyl ether solution of iron chloride with hydrogen sulphide gas according to the following reaction:

$$2FeCl_3 + 3H_2S \rightarrow 2FeS + S + 6HCl$$

The products of reaction, sulphur and hydrogen chloride are removed from the pores by roasting in an inert atmosphere at a temperature of 400° C.

It should be pointed out, in addition, in each of the above examples that the porous material may be any matrix having pores which communicate with each other, the matrix material being any material not adversely affected by the chosen reagents.

It is apparent from the foregoing illustrative examples of invention that in order to impregnate with a given impregnant salt, it is necessary to choose a solvent which will not dissolve the impregnant salt, but which will dissolve some salt containing the cation of the impregnant salt. It is then necessary to diffuse a gas into the cation containing solution, the characteristics of which are that it will precipitate the desired impregnant salt. Thus, in Example 7, it would be impossible to obtain a uniform impregnation of sodium chloride from an aqueous solution thereof. Therefore, in accordance with this invention, sodium ethylate dissolved in ethyl alcohol furnishes the sodium ion, while the chloride ion is furnished by the hydrochloric acid gas. In the case of iron sulphide it would be possible to use either an ether solution or a water solution in precipitating ferric chloride with hydrogen sulphide gas.

Although the invention has been described and illustrated in detail, it is to be clearly understod that the same is by way of illustration and example only and is not to be taken by way of limitation, the spirit and scope of this invention being limited only by the terms of the appended claims.

I claim:

1. A method of impregnating a porous body with an inorganic uranium-containing salt comprising dissolving a water-soluble uranium-containing salt in water; saturating the intercommunicating pores of said porous body with said salt solution; diffusing ammonia gas into the intercommunicating pores of said body, said ammonia gas in water being chemically reacting with said water-soluble uranium-containing salt in said water solvent to form a non-water-soluble uranium-containing precipitate; and evaporating the volatile unprecipitated products from said intercommunicating pores whereby said uranium-containing precipitate is uniformly distributed in said intercommunicating pores of said porous body.

2. A method of impregnating a graphite body with a solid inorganic uranium-containing compound comprising dissolving uranyl nitrate in water; saturating the intercommunicating pores of said graphite body with said uranyl nitrate solution; diffusing ammonia gas into said solution in said pores; and evaporating the unprecipitated reaction products and said water solvent from said pores whereby solid ammonium diuranate remains uniformly distributed in said pores.

3. The method recited in claim 2 and further comprising heating said graphite body containing said ammonium diuranate precipitate to thereby decompose said ammonium diuranate to an oxide of uranium.

4. The method of producing a fuel element for a solid core, graphite moderated, homogeneous nuclear research reactor utilizing U–235 as the nuclear fuel comprising forming a block of porous graphite in the desired size and shape of said fuel element; dissolving uranyl nitrate containing uranium enriched in the U–235 isotope in water, the concentration of U–235 atoms per unit volume of said solution being substantially equivalent to the desired concentration of U–235 atoms per unit volume in said fuel element multiplied by the effective porosity of said block of porous graphite; then saturating the interconnected pores of said block of porous graphite with said aqueous solution of uranyl nitrate; then diffusing ammonia gas into said aqueous uranyl nitrate solution in said interconnected pores until substantially all of said uranyl nitrate is chemically reacted to form ammonium uranate, then subjecting said block to a dry gas until all volatile compounds in said interconnected pores are volatilized, and then heating the resulting block to decompose said ammonium uranate to an oxide of uranium.

5. A method of impregnating a porous body with an inorganic uranium-containing salt comprising dissolving a water-soluble uranium-containing salt in water; saturating the intercommunicating pores of said porous body with said salt solution; diffusing a water-soluble gas selected from the group consisting of ammonia, hydrogen sulfide, sulfur oxides, and hydrohalic acids into the intercommunicating pores of said body, said gas in water being chemically reacting with said water-soluble uranium-containing salt in said water solvent to form a non-water-soluble uranium-containing precipitate; and evaporating the volatile unprecipitated products from said intercommunicating pores whereby said uranium-containing precipitate is uniformly distributed in said intercommunicating pores of said porous body.

6. The method of claim 5, wherein said porous body is graphite.

(References on following page)

References Cited in the file of this patent

UNITED STATES PATENTS

| | | |
|---|---|---|
| 2,162,366 | Barker et al. | June 13, 1939 |
| 2,451,805 | Callinan | Oct. 19, 1948 |
| 2,685,542 | Woodburn et al. | Sept. 3, 1954 |
| 2,754,231 | Ramandanoff et al. | July 10, 1956 |
| 2,758,006 | Carter et al. | Aug. 7, 1956 |
| 2,835,608 | Kanter | May 20, 1958 |

OTHER REFERENCES

ANL-4153, U.S. Atomic Energy Commission Document, dated July 23, 1948, declassified December 14, 1955, pages 6 and 8.

U.S. Atomic Energy Commission Document NAA-SR-151, September 14, 1951, pages 4, 5, 6.